UNITED STATES PATENT OFFICE 2,461,663

PREPARATION OF ALKALI METAL BOROHYDRIDES

Hermann I. Schlesinger, Chicago, Ill., and Herbert C. Brown, Detroit, Mich., assignors to the United States of America as represented by the United States Atomic Energy Commission No Drawing. Application January 11, 1945, Serial No. 572,436

10 Claims. (Cl. 23—14)

The invention relates to the preparation of borohydrides of the alkali metals.

It is an object of the invention to provide an efficient and convenient process for the preparation of alkali metal borohydrides. A more specific object of the invention is the provision of a process in which an alkali metal tetraalkoxyborate is reacted with a boron hydride to form an alkali metal borohydride. Further objects and advantages will be apparent from the following description.

In accordance with the present invention it has been found that an alkali metal borohydride such as sodium borohydride may be obtained from the reaction of an alkali metal tetraalkoxyborate and diborane, $B_2H_6$. The reaction between the diborane and the alkali metal tetraalkoxyborate probably proceeds in accordance with the following reaction:

$$3MeB(OR)_4 + B_2H_6 \rightarrow 3MeBH_4 + 4B(OR)_3$$

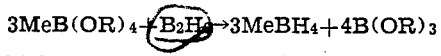

in which Me indicates an alkali metal and R indicates a monovalent organic radical derived from a monohydric alcohol (ROH). Mixed tetraalkoxyborates containing two or more different R groups also may be used.

In forming the alkali metal borohydride by the reaction of an alkali metal tetraalkoxyborate and diborane, the alkali metal tetraalkoxyborate is placed in a reaction vessel which is substantially free from air and diborane is introduced into the reaction vessel and into contact with the alkali metal tetraalkoxyborate under suitable conditions of time and temperature. The reaction proceeds at room temperature and below. However, elevated temperatures, for example, up to 50° C. also may be used. If desired, a quantity of diborane sufficient to convert all of the alkali metal tetraalkoxyborate to the corresponding alkali metal borohydride may be introduced into the reaction vessel and into contact with the alkali metal tetraalkoxyborate and the diborane then is maintained in contact with the alkali metal tetraalkoxyborate until the reaction is complete. Alternatively gaseous diborane may be passed through or over the alkali metal tetraalkoxyborate.

The alkali metal tetraalkoxyborate utilized in the process may be represented by the formula Me(OR)$_4$ in which Me indicates an alkali metal such as sodium, potassium or lithium and R indicates a monovalent radical such as, an alkyl group derived from a monovalent alcohol ROH. The lower alkali metal tetraalkoxyborates such as, for example, the methyl, ethyl, propyl, isobutyl, allyl, methallyl, butyl or the like are of particular interest in the process. However, higher tetraalkoxyborates such as the lauryl, cinnamyl, or stearyl derivatives may be used if desired. The tetraalkoxyborates may be formed by reaction of alkyl borates with alkali metal alkoxides.

In one manner of preparation of the alkali metal borohydride, the alkali metal tetraalkoxyborate and the diborane are reacted in a closed system formed by a suitable apparatus. The closed system may comprise, in essence, a closed reactor provided with conventional means for supplying reactants thereto and for distilling off volatile products.

In carrying out the process, a suitable quantity of the alkali metal tetraalkoxyborate is placed in the reactor and air is substantially completely removed from the reactor by flushing with nitrogen or other non-reactive gas or by evacuation of the reactor. Thereafter diborane is introduced and the reaction permitted to take place with or without heating.

The following specific examples illustrate the process embodying the invention for the preparation of lithium borohydride, sodium borohydride, and potassium borohydride.

*Example I.*—Sodium tetramethoxyborate, NaB(OCH$_3$)$_4$, in the amount of 0.5017 gram was introduced into a reactor comprising a heat resistant tubular reactor equipped with an agitator. The reactor was evacuated to substantially completely remove air from the system. Diborane in the amount of 54 cc., under standard conditions of temperature and pressure, was condensed in a gas bulb by means of liquid nitrogen, the gas bulb then being connected to the reactor. As the temperature of the gas bulb was permitted to rise to approximately that of room temperaure, the temperature of the reactor was substantially lowered by means of liquid nitrogen, such cooling accelerating the passage of the diborane from the gas bulb to the reactor. The cooling means surrounding the reactor was then removed. As the temperature of the reactor slowly rose, no noticeable reaction was observed for approximately fifteen minutes. When the temperature of the reactor rose, reaction proceeded vigorously. The reactor and contents were warmed to room temperature and allowed to stand for a short time. The volatile materials such as the methyl borate and sodium dimethoxyborane, resulting from the reaction, were distilled off leaving sodium borohydride as a solid residue in the reactor. A yield of sodium borohydride of approximately 85 per cent of the theoretical yield was obtained. The corresponding sodium tetraethoxyborate, $NaB(OC_2H_5)_4$ or n-propyl derivative, $NaB(OC_3H_7)_4$ may be used in a similar manner.

*Example II.*—Potassium tetramethoxyborate, $KB(OCH_3)_4$ in the amount of 7.3 grams was introduced into a reactor comprising a heat-resistant glass tube. The reactor was evacuated to substantially completely remove air. Diborane in the amount of 689.3 cubic centimeters, under standard conditions of temperature and pressure, was condensed in a gas bulb by means of liquid nitrogen, the gas bulb then being connected to the reactor. As the temperature of the gas bulb was permitted to rise to approximately that of room temperature, the reactor was substantially cooled by liquid nitrogen, such cooling accelerating the passage of the diborane from the gas bulb to the reactor. The cooling means surrounding the reactor was removed, thereby permitting the temperature of the reactor to rise. As the temperature of the reactor rose from $-80°$ C., the reaction between the potassium tetramethoxyborate and the diborane proceeded vigorously. The reactor and contents were then permitted to stand at room temperature for approximately two days to insure completion of the reaction. The potassium borohydride was heated to approximately 190° C. for several hours to insure elimination of all volatile materials such as methyl borate and potassium dimethoxyborane, the potassium borohydride remaining as a solid residue in the reactor. A yield of potassium borohydride of approximately 90 per cent of the theoretical yield was obtained.

*Example III.*—Lithium tetramethoxyborate, $LiB(OCH_3)_4$, in the amount of 1.0874 grams was introduced into a reactor comprising a heat-resistant glass tube. Air was substantially completely removed by evacuation of the reactor. Diborane in the amount of 187 cubic centimeters referring to standard conditions was condensed in a gas bulb by means of liquid nitrogen, the gas bulb then being connected to the reactor. As the temperature of the gas bulb was permitted to rise to approximately that of room temperature, the reactor was substantially cooled by liquid nitrogen, such cooling accelerating the passage of the diborane from the gas bulb to the reactor. The cooling means surrounding the reactor was removed, thereby permitting the temperature of the reactor to rise. As the temperature of the reactor rose from $-80°$ C., the reaction between the lithium tetramethoxyborate and the diborane proceeded vigorously. The reactor and contents were allowed to stand at room temperature for approximately two days to insure completion of the reaction. The volatile materials such as methyl borate and lithium dimethoxyborane resulting from the reaction were distilled off leaving lithium borohydride as a solid residue in the reactor. The lithium borohydride was further purified by ether extraction. A yield of lithium borohydride of approximately 90 per cent of the theoretical yield was obtained.

The above detailed description is for purposes of illustration and specific embodiments thereof are not intended to limit the scope of the invention except insofar as included in the following claims.

We claim:

1. A process of preparing an alkali metal borohydride which comprises reacting diborane and an alkali metal tetraalkoxyborate.

2. A process of preparing an alkali metal borohydride which comprises reacting diborane and an alkali metal tetramethoxyborate.

3. A process of preparing sodium borohydride which comprises reacting diborane and a sodium tetraalkoxyborate.

4. A process of preparing sodium borohydride which comprises reacting diborane and sodium tetramethoxyborate.

5. A process of preparing an alkali metal borohydride which comprises reacting diborane and an alkali metal tetraalkoxyborate in a closed system.

6. A process of preparing an alkali metal borohydride which comprises passing diborane over an alkali metal tetraalkoxyborate at a temperature of between $-80°$ C. and $50°$ C.

7. A process of preparing an alkali metal borohydride which comprises reacting diborane and an alkali metal tetraalkoxyborate in a closed system while maintaining the system substantially free from air.

8. A process of preparing an alkali metal borohydride which comprises introducing an alkali metal tetraalkoxyborate into a reactor, removing a substantial amount of air from the reactor, and introducing diborane into the reactor and into contact with the alkali metal tetraalkoxyborate, the temperature of the alkali metal tetraalkoxyborate and diborane in the reactor being maintained between $-80°$ C. and $50°$ C.

9. A process of preparing potassium borohydride which comprises reacting diborane and a potassium tetraalkoxy borate.

10. A process of preparing lithium borohydride which comprises reacting diborane and a lithium tetraalkoxy borate.

HERMANN I. SCHLESINGER.
HERBERT C. BROWN.

No references cited.

Certificate of Correction

Patent No. 2,461,663.                                                                                   February 15, 1949.

HERMANN I. SCHLESINGER ET AL.

It is hereby certified that errors appear in the printed specification of the above numbered patent requiring correction as follows:

Column 1, line 16, for "$H_2H_6$" read $B_2H_6$; line 50, for "$Me(OR)_4$" read $MeB(OR)_4$; column 3, line 3, for "$Nab(OC_3H_7)_4$," read $NaB(OC_3H_7)_4$; and that the said Letters Patent should be read with these corrections therein that the same may conform to the record of the case in the Patent Office.

Signed and sealed this 6th day of September, A. D., 1949.

[SEAL]

THOMAS F. MURPHY,
*Assistant Commissioner of Patents.*